United States Patent
Li et al.

(10) Patent No.: US 12,022,499 B2
(45) Date of Patent: Jun. 25, 2024

(54) DOWNLINK CONTROL INFORMATION SENDING METHOD AND RECEIVING METHOD, APPARATUS, AND STORAGE MEDIUM

(71) Applicant: Beijing Xiaomi Mobile Software Co., Ltd., Beijing (CN)

(72) Inventors: Yuanyuan Li, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 591 days.

(21) Appl. No.: 17/158,771

(22) Filed: Jan. 26, 2021

(65) Prior Publication Data

US 2021/0153208 A1 May 20, 2021

Related U.S. Application Data

(63) Continuation of application No. PCT/CN2018/097267, filed on Jul. 26, 2018.

(51) Int. Cl.
*H04W 72/53* (2023.01)
*H04W 72/044* (2023.01)
(Continued)

(52) U.S. Cl.
CPC ....... *H04W 72/53* (2023.01); *H04W 72/0446* (2013.01); *H04W 72/0453* (2013.01); *H04W 72/0466* (2013.01); *H04W 72/23* (2023.01)

(58) Field of Classification Search
CPC ..... H04L 27/2601; H04L 5/0053; H04L 5/00; H04L 1/00; H04W 28/0268; H04W 28/10;
(Continued)

(56) References Cited

U.S. PATENT DOCUMENTS

| | | | |
|---|---|---|---|
| 2011/0134774 A1* | 6/2011 | Pelletier | H04W 76/15 370/242 |
| 2012/0213196 A1* | 8/2012 | Chung | H04L 5/0007 370/336 |

(Continued)

FOREIGN PATENT DOCUMENTS

| | | |
|---|---|---|
| CN | 102158973 A | 8/2011 |
| CN | 106851846 A | 6/2017 |

(Continued)

OTHER PUBLICATIONS

Combined Chinese Office Action and Search Report dated Apr. 25, 2021 in Patent Application No. 201880001202.4 (with English language translation), 15 pages.

(Continued)

*Primary Examiner* — Nathan S Taylor
(74) *Attorney, Agent, or Firm* — Oblon, McClelland, Maier & Neustadt, L.L.P.

(57) ABSTRACT

The present disclosure relates to a downlink control information sending method and receiving method, an apparatus, and a storage medium. The downlink control information sending method can be applied to a network side device, and the method can include, when determined that a terminal uses a preset type of service, sending information of PDCCH resources to the terminal such that the terminal receives DCI of the preset type of service on the PDCCH resources. The method can further include, by means of the PDCCH resources, sending the DCI of the preset type of service to the terminal. The present disclosure can reduce the complexity of acquiring DCI of a preset type of service, and decreases time delays in acquiring DCI of a preset type of service.

16 Claims, 6 Drawing Sheets

(51) Int. Cl.
*H04W 72/0446* (2023.01)
*H04W 72/0453* (2023.01)
*H04W 72/23* (2023.01)

(58) Field of Classification Search
CPC ..... H04W 76/10; H04W 80/02; H04W 76/12; H04W 28/02; H04W 80/10; H04W 76/20; H04W 48/12; H04W 72/0446; H04W 72/0453; H04W 72/0466; H04W 72/20; H04W 72/23; H04W 72/53; H04W 72/04
See application file for complete search history.

(56) References Cited

U.S. PATENT DOCUMENTS

| | | | |
|---|---|---|---|
| 2013/0336189 A1 | 12/2013 | Mandil et al. | |
| 2014/0286292 A1* | 9/2014 | Park | H04L 5/0053 370/329 |
| 2015/0207607 A1* | 7/2015 | Tang | H04L 1/1861 370/330 |
| 2016/0373233 A1* | 12/2016 | Pelletier | H04W 72/20 |
| 2018/0324689 A1* | 11/2018 | Li | H04W 74/0808 |
| 2019/0082453 A1* | 3/2019 | Lyu | H04W 65/40 |
| 2019/0110309 A1* | 4/2019 | Xu | H04L 5/0048 |
| 2019/0132824 A1* | 5/2019 | Jeon | H04L 5/0092 |
| 2019/0132845 A1* | 5/2019 | Babaei | H04L 1/1812 |
| 2019/0132862 A1* | 5/2019 | Jeon | H04L 5/0098 |
| 2019/0141546 A1* | 5/2019 | Zhou | H04B 7/0626 |
| 2019/0149380 A1* | 5/2019 | Babaei | H04W 72/0446 370/330 |
| 2019/0174440 A1* | 6/2019 | Kwak | H04W 56/001 |
| 2019/0207662 A1* | 7/2019 | Zhou | H04W 24/08 |
| 2019/0207737 A1* | 7/2019 | Babaei | H04L 5/0098 |
| 2019/0222364 A1* | 7/2019 | Shimoda | H04W 74/0833 |
| 2019/0222462 A1* | 7/2019 | Nammi | H04L 1/0016 |
| 2019/0289513 A1* | 9/2019 | Jeon | H04W 36/06 |
| 2020/0022171 A1* | 1/2020 | Guan | H04B 7/0695 |
| 2020/0068607 A1* | 2/2020 | Jiang | H04L 5/0007 |
| 2020/0092044 A1* | 3/2020 | Park | H04L 1/189 |
| 2020/0112959 A1* | 4/2020 | Gong | H04L 1/1822 |
| 2020/0314896 A1* | 10/2020 | Koorapaty | H04W 72/21 |
| 2020/0383096 A1* | 12/2020 | Yang | H04L 5/0094 |
| 2021/0051687 A1* | 2/2021 | Yang | H04W 56/0045 |
| 2023/0037317 A1* | 2/2023 | Kwak | H04L 25/0202 |

FOREIGN PATENT DOCUMENTS

| | | | | |
|---|---|---|---|---|
| CN | 107241288 A | | 10/2017 | |
| CN | 107294667 A | | 10/2017 | |
| CN | 107370562 A | | 11/2017 | |
| CN | 107889217 A | | 4/2018 | |
| CN | 107889259 A | | 4/2018 | |
| EP | 3404984 B1 | * | 4/2021 | .......... H04W 72/042 |
| WO | WO 2010127300 A2 | | 11/2010 | |
| WO | WO-2016148622 A1 | * | 9/2016 | .......... H04L 1/1893 |
| WO | WO 2017/016332 A1 | | 2/2017 | |
| WO | WO 2017/128878 A1 | | 8/2017 | |
| WO | WO-2017147515 A1 | * | 8/2017 | .......... H04L 1/0031 |
| WO | WO 2018/059596 A1 | | 4/2018 | |
| WO | WO-2019029668 A1 | * | 2/2019 | .......... H04W 74/006 |

OTHER PUBLICATIONS

Yu-Jia Chen, et al., "Prioritized Resource Reservation for Reducing Random Access Delay in 5G URLLC," 2017 IEEE 28$^{th}$ Annual International Symposium on Personal, Indoor, and Mobile Radio Communications (PIMRC), 2017, 5 pages.

Jimmy J. Nielsen, et al., "Optimized Interface Diversity for Ultra-Reliable Low Latency Communication (URLLC)," GLOBECOM 2017—2017 IEEE Global Communications Conference, Dec. 14, 2017, 6 pages.

Huang Chenheng, "5G High-Reliability and Low-Latency Communication (uRLLC) Physical Layer Requirements and Implementation Overview," Guangdong Communication Youth Forum, Dec. 30, 2017, 9 pages (with English Abstract).

International Search Report issued in International Application No. PCT/CN2018/097267 dated Apr. 3, 2019 (with English translation) 5pgs.

Written Opinion of the International Searching Authority issued in International Application No. PCT/CN2018/097267 dated Apr. 3, 2019 (with English translation) 7 pgs.

Office Action issued in Chinese Patent Application No. 201880001202.4 dated Sep. 3, 2020. 6 pgs.

Chinese Notice of Allowance issued Mar. 10, 2022, in Chinese Patent Application No. 201880001202.4, 3 pages.

* cited by examiner

DOWNLINK CONTROL INFORMATION SENDING METHOD AND RECEIVING METHOD, APPARATUS, AND STORAGE MEDIUM

CROSS-REFERENCE TO RELATED APPLICATION

The present application is a Continuation Application of PCT Application No. PCT/CN2018/097267, filed on Jul. 26, 2018, the disclosure of which is incorporated herein by reference in its entirety.

TECHNICAL FIELD

The present disclosure relates to the field of communication technology, and in particular to a method and device for sending downlink control information, a method and device for receiving downlink control information and a storage medium.

BACKGROUND

A Physical Downlink Control Channel (PDCCH) can be used to carry Downlink Control Information (DCI), such as downlink scheduling instructions, downlink data transmission instructions, and common control information. According to different purposes and information content, there are different formats for the DCI. A bit length of each DCI format is related to a resource allocation type, a system bandwidth, the number of antenna ports and so on. For different DCI formats, the size of the DCI included in the PDCCH is between about 30 bits and about 50 bits. The DCI information of the PDCCH is used to implicitly identify a target terminal to which the DCI is to be sent by scrambling a Cell Radio Network Temporary Identifier (C-RNTI) of the terminal into a 16-bit Cyclic Redundancy Check (CRC). Since the PDCCH is shared by multiple users, the terminal needs to perform blind detection on the received data in the entire control area for different DCI lengths, and identify the DCI belonging to the terminal by the data blocks of the CRC check, which increases the complexity of terminal operations, thereby increasing the transmission delay of the DCI.

SUMMARY

The present disclosure provides a method and device for sending downlink control information, a method and device for receiving downlink control information, and a storage medium.

According to a first aspect of the present disclosure, there is provided a method for sending downlink control information. The method can be applied to a network-side device and include sending information of a Physical Downlink Control Channel (PDCCH) resource to a terminal when it is determined that the terminal uses a preset type of service, to cause the terminal to receive Downlink Control Information (DCI) of the preset type of service on the PDCCH resource. The method can further include sending the DCI of the preset type of service to the terminal through the PDCCH resource.

In some embodiments, the method can further include configuring the PDCCH resource for the terminal with a Resource Element Group (REG) or a Resource Block (RB) used as a minimum unit of the PDCCH resource before sending the information of the PDCCH resource to the terminal.

In some embodiments, sending the information of the PDCCH resource to the terminal can include sending control signaling to the terminal, where the control signaling indicates an identity of the PDCCH resource or an identity of an activated PDCCH resource, and the activated PDCCH resource includes the PDCCH resource pre-configured by the network-side device for the terminal.

In other embodiments, configuring the PDCCH resource for the terminal includes configuring the PDCCH resource for the terminal in a semi-static configuration manner or a dynamic configuration manner.

Further, in some embodiments, the preset type of service include an Ultra Reliable and Low Latency Communication (URLLC) service.

In some embodiments, the PDCCH resource can include at least one of the following: a time domain resource, a frequency domain resource, and a code domain resource.

According to a second aspect of the present disclosure, there is provided a method for receiving downlink control information. The method can be applied to a terminal and include receiving, according to received information of a Physical Downlink Control Channel (PDCCH) resource sent by a network-side device when a preset type of service is performed, Downlink Control Information (DCI) of the preset type of service on the PDCCH resource. The method can further include identifying and receiving a Physical Downlink Shared Channel (PDSCH) message for the terminal on a PDSCH according to the DCI.

In some embodiments, the method can further include receiving control signaling sent by the network-side device prior to receiving, according to the received information of the PDCCH resource sent by a network-side device when the preset type of service is performed, the DCI of the preset type of service on the PDCCH resource, where the control signaling indicates an identity of the PDCCH resource or an identity of an activated PDCCH resource, and the activated PDCCH resource includes the PDCCH resource pre-configured by the network-side device for the terminal.

In some embodiments, the method can further include receiving the PDCCH resource configured by the network-side device for the terminal with a Resource Element Group (REG) or Resource Block (RB) used as a minimum unit of PDCCH resource prior to receiving, according to the received information of the PDCCH resource sent by a network-side device when the preset type of service is performed, the DCI of the preset type of service on the PDCCH resource.

In other embodiments, the PDCCH resource configured by the network-side device for the terminal device is configured in a semi-static configuration manner or a dynamic configuration manner.

In further embodiments, the preset type of service can include an Ultra-Reliable and Low Latency Communication (URLLC) service.

Additionally, in some embodiments, the PDCCH resource can include at least one of the following: a time domain resource, a frequency domain resource, and a code domain resource.

According to a third aspect of the present disclosure, a device for sending downlink control information is provided. The device is applied to a network-side device, and the device can include a first sending module that is configured to send information of a Physical Downlink Control Channel (PDCCH) resource to a terminal when it is determined that the terminal uses a preset type of service, to cause the terminal to receive Downlink Control Information (DCI) of the preset type of service on the PDCCH resource. The device can further a second sending module that is configured to send the DCI of the preset type of service to the terminal through the PDCCH resource.

In some embodiments, the device further includes a configuration module configured to configure the PDCCH resource for the terminal by using a Resource Element Group (REG) or a Resource Block (RB) as a minimum unit of the PDCCH resource before the information of the PDCCH resource is sent to the terminal.

In other embodiments, the first sending module is configured to send control signaling to the terminal, where the control signaling indicates an identity of the PDCCH resource or an identity of an activated PDCCH resource, and the activated PDCCH resource includes the PDCCH resource pre-configured by the network-side device for the terminal.

In additional embodiments, the configuration module is configured to configure the PDCCH resource for the terminal in a semi-static configuration manner or a dynamic configuration manner.

In some embodiments, the preset type of service can include an Ultra-Reliable and Low Latency Communication (URLLC) service.

Additionally, in some embodiments, the PDCCH resource can include at least one of the following: a time domain resource, a frequency domain resource, and a code domain resource.

According to a fourth aspect of the present disclosure, a device for receiving downlink control information is provided. The device can be applied to a terminal and includes a first receiving module that is configured to receive, according to received information of a Physical Downlink Control Channel (PDCCH) resource sent by a network-side device when a preset type of service is performed, Downlink Control Information (DCI) of the preset type of service on the PDCCH resource. The device can further include a second receiving module that is configured to identify and receive a Physical Downlink Share Channel (PDSCH) message for the terminal on a PDSCH according to the DCI.

In some embodiments, the device can further include a third receiving module that is configured to receive control signaling sent by the network-side device prior to the receiving of the DCI of the preset type of service on the PDCCH resource according to the received information of the PDCCH resource sent by the network-side device, where the control signaling indicates an identity of the PDCCH resource or an identity of an activated PDCCH resource. The activated PDCCH resource can include the PDCCH resource pre-configured by the network-side device for the terminal.

In some embodiments, the device further includes a fourth receiving module that is configured to receive the PDCCH resource configured by the network-side device for the terminal with a Resource Element Group (REG) or a Resource Block RB used as a minimum unit of PDCCH resource prior to the receiving of the DCI of the preset type of service on the PDCCH resource according to the received information of the PDCCH resource sent by the network-side device.

In some embodiments, the PDCCH resource configured by the network-side device for the terminal device is configured in a semi-static configuration manner or a dynamic configuration manner.

In other embodiments, the preset type of service can include an Ultra Reliable and Low Latency Communication (URLLC) service.

In further embodiments, the PDCCH resource can include at least one of the following: a time domain resource, a frequency domain resource, and a code domain resource.

According to a fifth aspect of the present disclosure, a device for sending downlink control information is provided. The device can be applied to a network-side device, and include a processor and a memory for storing instructions executable by the processor. The processor can be configured to send information of a Physical Downlink Control Channel (PDCCH) resource to a terminal when it is determined that the terminal uses a preset type of service, to cause the terminal to receive Downlink Control Information DCI of the preset type of service on the PDCCH resource, and send the DCI of the preset type of service to the terminal through the PDCCH resource.

According to a sixth aspect of the present disclosure, there is provided a non-transitory computer-readable storage medium storing instructions which, when being executed by a processor, cause the processor to perform the method according to the first aspect of the present disclosure.

According to a seventh aspect of the present disclosure, there is provided a device for receiving downlink control information. The method can be applied to a terminal. The device can include a processor and a memory for storing instructions executable by the processor. The processor can be configured to receive, according to received information of a Physical Downlink Control Channel (PDCCH) resource sent by a network-side device when a preset type of service is performed, Downlink Control Information (DCI) of the preset type of service on the PDCCH resource, and identify and receive a Physical Downlink Shared Channel (PDSCH) message for the terminal on a PDSCH according to the DCI.

According to an eighth aspect of the present disclosure, there is provided a non-transitory computer-readable storage medium storing instructions which, when being executed by a processor, cause the processor to perform the method according to the second aspect of the present disclosure.

It should be understood that the above general description and the following detailed description are only exemplary and explanatory, and do not limit the disclosure.

BRIEF DESCRIPTION OF THE DRAWINGS

The drawings herein are incorporated in and constitute a part of this specification, illustrate embodiments consistent with the present invention, and together with the description serve to explain the principles of the present disclosure.

DETAILED DESCRIPTION

Exemplary embodiments will be described in detail here, examples of which are illustrated in the accompanying drawings. When the following description refers to the accompanying drawings, the same numerals in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure as detailed in the appended claims.

Figure 1:
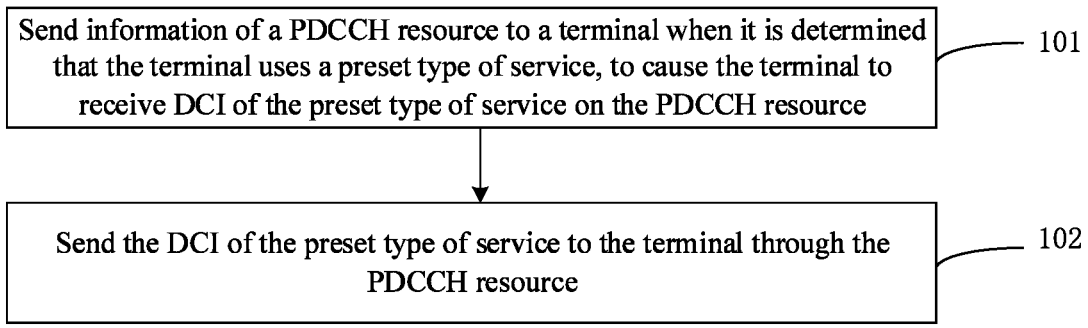
FIG. 1 is a flow chart showing a method for sending downlink control information according to an exemplary embodiment.

FIG. 1 is a flow chart showing a method for sending downlink control information according to an exemplary embodiment. The method can be applied to a network-side device, that is, the method can be performed by the network-side device, and the network-side device is, for example, a base station. As shown in FIG. 1, the method include can include the following steps.

In step 101, information of a PDCCH resource can be sent to a terminal when it is determined that the terminal uses a preset type of service, to cause the terminal to receive DCI of the preset type of service on the PDCCH resource. In an implementation, prior to step 101, the terminal may send a Radio Resource Control (RRC) access request to the network-side device to request establishing an RRC connection with the network-side device, and when the terminal sends the access request to the network-side device, the terminal may report a service type of the requested service to the network-side device at the same time, and the network-side device can determine whether the terminal currently uses a preset type of service according to the service type.

In an additional implementation, the information of the PDCCH resource sent by the network-side device to the terminal may include a dedicated physical bearer resource dedicated to receiving by the terminal the DCI of the preset type of service sent by the network-side device. Further, in an implementation, the network-side device may configure the PDCCH resource for the terminal in a dynamic configuration manner or a semi-static configuration manner.

In step 102, the DCI of the preset type of service can be sent to the terminal through the PDCCH resource. In an implementation, the network-side device may determine whether the type of service for the DCI is the above preset type when it needs to send the DCI to the terminal, and when determining that the type of service for the DCI is the above preset type, the network-side device sends the DCI to the terminal using the PDCCH resource pre-configured for the terminal.

In the method for sending downlink control information in this embodiment, the network-side device sends the information of the PDCCH resource for receiving the DCI of the preset type of service to the terminal when the terminal uses the preset type of service, and sends the DCI of the preset type of service to the terminal using the PDCCH resource, so that the terminal can receive the DCI of the preset type of service on the PDCCH resource without performing the blind detection in any possible PDCCH transmission area, which reduces the complexity of obtaining the DCI of the preset type of service, and reduces the delay in obtaining the DCI of the preset type of service.

Figure 2:
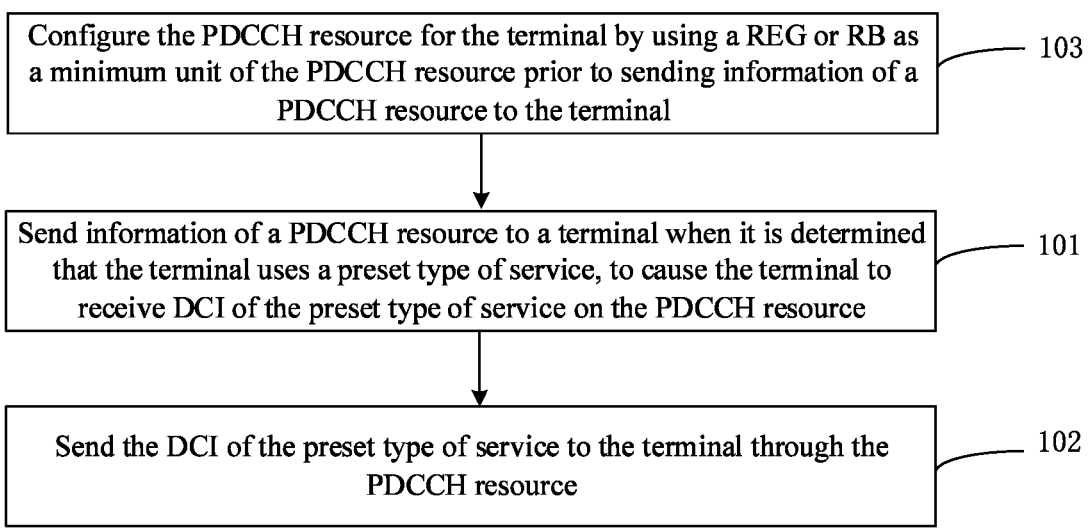
FIG. 2 is a flow chart showing a method for sending downlink control information according to an exemplary embodiment.

FIG. 2 is a flow chart showing a method for sending downlink control information according to an exemplary embodiment. As shown in FIG. 2, the method may further include, in step 103, prior to sending the information of the PDCCH resource to the terminal, configuring the PDCCH resource for the terminal by using a Resource Element Group (REG) or a Resource Block (RB) as a minimum unit of the PDCCH resource. For example, the network-side device can configure at least one REG or RB for the terminal, as a PDCCH resource dedicated to the terminal to receive the DCI of the preset type of service. The network-side device uses the REG or RB as the minimum unit of the PDCCH resource configured for the terminal, so that the basic unit of PDCCH resource mapping is no longer limited to Control Channel Element (CCE), and the utilization of the REG or RB resources by the terminal can be improved.

Figure 3:
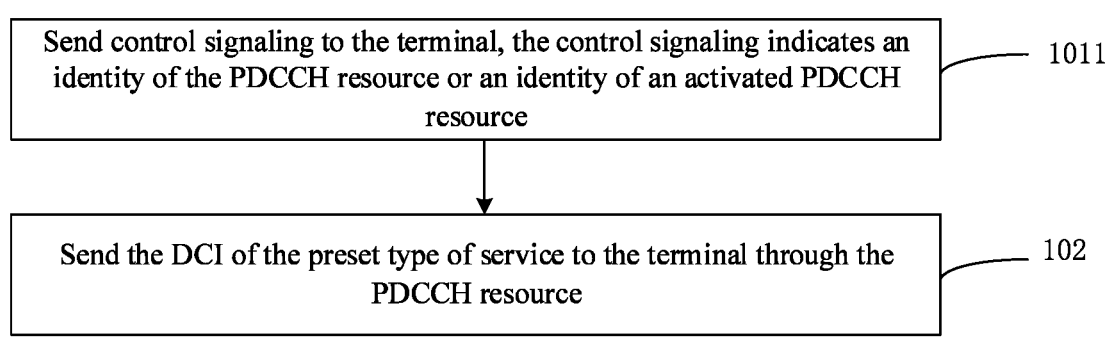
FIG. 3 is a flow chart showing a method for sending downlink control information according to an exemplary embodiment.

FIG. 3 is a flowchart showing a method for sending downlink control information according to an exemplary embodiment. As shown in FIG. 3, in this method, sending the information of the PDCCH resource to the terminal may include sending control signaling to the terminal in step 1011, the control signaling indicates an identity of the PDCCH resource, and after receiving the control signaling, the terminal can receive the DCI for the terminal on the indicated PDCCH resource according to the identity of the indicated PDCCH resource. Alternatively, the control signaling indicates an identity of an activated PDCCH resource, and after receiving the control signaling, the terminal can receive the DCI for the terminal on the activated PDCCH resource according to the identity of the activated PDCCH resource. The activated PDCCH resource includes the PDCCH resource pre-configured by the network-side device for the terminal. The control signaling may also indicate a service type identity of the preset type of service, and information such as a validity period of the PDCCH resource configured for the terminal. The control signaling may be, for example, RRC signaling or other high-level signaling.

In an implementation, configuring the PDCCH resource for the terminal may include: configuring the PDCCH resource for the terminal in a semi-static configuration manner or a dynamic configuration manner. When the network-side device configures the PDCCH resource for the terminal in the semi-static configuration manner, a validity period of the PDCCH resource can be set. During the validity period, the PDCCH resource can be used by the terminal. After the valid period expires, the PDCCH resource cannot be used by the terminal. In addition, the network-side device can also notify the terminal of the PDCCH resources configured for it in advance, and then notify the terminal of the activated PDCCH resources before sending the DCI of the preset type of service to the terminal, so that the terminal can receive the DCI sent by the network-side device on the activated PDCCH resource. When the network-side device configures the PDCCH resource for the terminal in the dynamic configuration manner, the network-side device may send control signaling to the terminal before sending the DCI message of the preset type of service to the terminal, and indicate the PDCCH resource in the control signaling, and the terminal can receive the DCI sent by the network-side device on the PDCCH resource indicated in the control signaling.

In a further implementation, the preset type of service can be communication services with high requirement on the reliability and latency, such as an Ultra Reliable & Low Latency Communication (URLLC) service, or other communication services than the URLLC service.

In other implementations, the above-mentioned PDCCH resource may include at least one of a time domain resource, a frequency domain resource, and a code domain resource. For example, the network-side device may instruct the terminal to use any PCCCH resource of the time domain resources, the frequency domain resource or the code domain resource to receive the DCI of the preset type of service, or the network-side device can also configure at least one of the time domain resource, the frequency domain resource, or the code domain resource for the terminal concurrently, and instruct the terminal to activate the corresponding frequency domain time domain resource, frequency domain resource or code domain resource when the terminal needs to receive the DCI of the preset type, so that the terminal uses the activated corresponding PDCCH resource to receive the DCI of the service of the service type sent by the network-side device.

In an implementation, since the network-side device configures for terminal the PDCCH resource dedicated to receiving the DCI of the preset type of service, the terminal can receive its DCI on the dedicated PDCCH resource, and there is no need for the network-side device to scramble the C-RNTI of the terminal into the CRC in scrambling the CRC in the process of processing the PDCCH message to be sent, which simplifies the processing of the PDCCH message by the network-side device.

In additional implementations, if the network-side device does not receive a feedback message from the terminal or data sent by the terminal within a period of time, the network-side device can issue a radio resource release command. After a period of time since the command is issued, or after the command is issued, the PDCCH resource is released. Alternatively, the network-side device sets a validity period for the PDCCH resource when configuring the PDCCH resource for the terminal, and during the validity period, the PDCCH resource is dedicated to the configured terminal, and other terminals cannot use the PDCCH resource. After the validity period expires, the PDCCH resource can be configured by the network-side device for other terminals.

Figure 4:
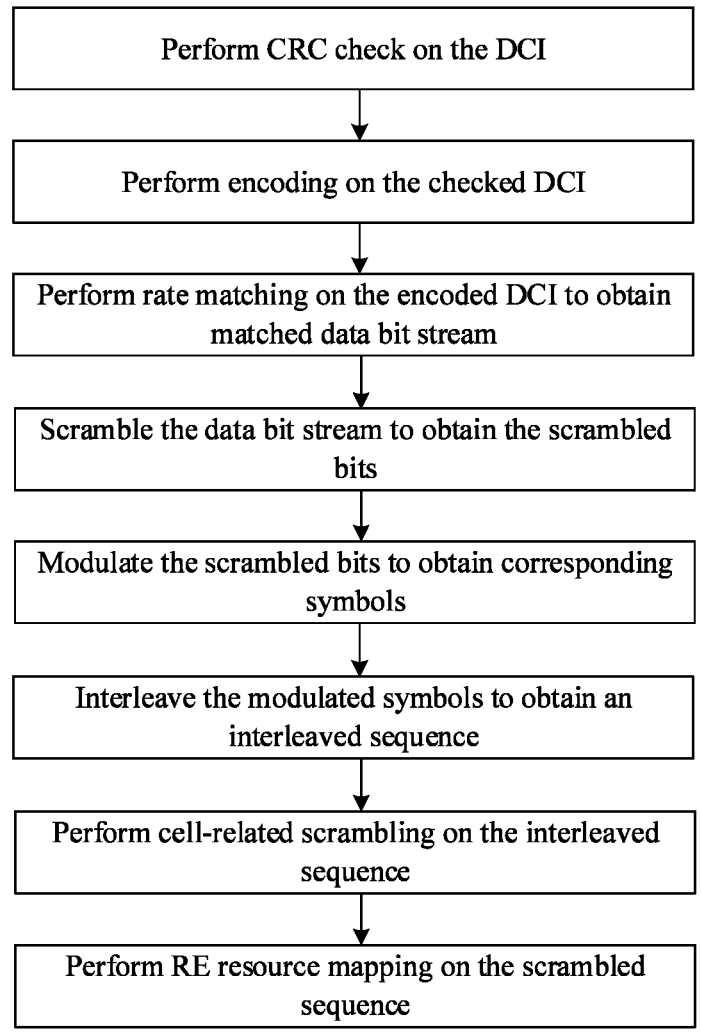
FIG. 4 is a flowchart showing processing of a PDCCH message in a method for sending downlink control information according to an exemplary embodiment.

In an implementation, the method for sending downlink control information may also include a flow of processing the PDCCH message by the network-side device before sending the DCI to the terminal through the PDCCH resource configured for the terminal. FIG. 4 shows a processing flow of the PDCCH message in the method for sending the downlink control information according to this embodiment. As shown in FIG. 4, the processing flow may include performing CRC check on the DCI without scrambling the C-RNTI of the terminal into the CRC in the process of performing the CRC check on the DCI, performing channel coding on the checked DCI, such as Pola encoding, to obtain a result of the encoding, and performing rate matching processing on the result of the encoding by using a communication protocol to obtain rate-matched data bit stream. The process flow can further include scrambling the data bit stream with the scrambling sequence without performing PDCCH multiplexing after the rate matching, to obtain the scrambled bits; modulating the scrambled bits with Quadrature Phase Shift Keying (QPSK) to obtain corresponding symbols, interleaving the obtained symbols to obtain an interleaved sequence, performing cell-related scrambling on the interleaved sequence, and performing Resource Element (RE) resource mapping on the scrambled sequence.

In the method for sending downlink control information according to the embodiments of the present disclosure, the network-side device sends the information of the PDCCH resource to the terminal when the terminal uses the preset type of service, and sends the DCI of the preset type of service to the terminal through the PDCCH resource, so that the terminal can receive the DCI of the preset type of service on the PDCCH resource without performing the blind detection in any possible PDCCH transmission area, which reduces the complexity of obtaining the DCI of the preset type of service, and reduces the delay in obtaining the DCI of the preset type of service.

Figure 5:
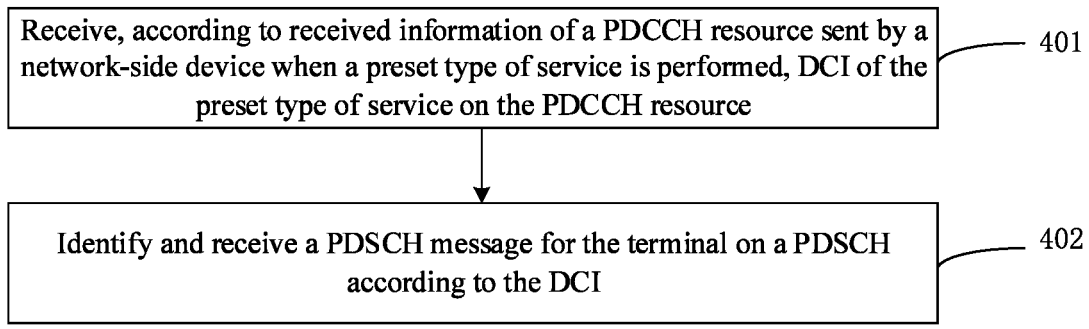
FIG. 5 is a flow chart showing a method for receiving downlink control information according to an exemplary embodiment.

FIG. 5 is a flowchart showing a method for receiving downlink control information according to an exemplary embodiment, and the method is applied to a terminal, that is, the method can be performed by the terminal. As shown in FIG. 5, the method can include the following steps.

In step 401, the method can include receiving, according to received information of a PDCCH resource sent by a network-side device when a preset type of service is performed, DCI of the preset type of service on the PDCCH resource; and In step 402, the method can include identifying and receiving a Physical Downlink Shared Channel (PDSCH) message for the terminal on a PDSCH according to the DCI. In an implementation, the terminal receives the DCI of the preset type of service using the PDCCH resource according to the information of the PDCCH resource sent to the terminal by the network-side device, and the terminal does not need to perform blind detection for the DCI of the preset type of service in the PDCCH transmission area, and can receive the message initially transmitted or retransmitted on the PDSCH according to the content of the DCI, where the DCI indicates the initially transmitted or retransmitted message for the terminal on the PDSCH.

The method for receiving the downlink control information according to this embodiment allows the terminal to receive the DCI of the preset type of service on the PDCCH resource according to the information of the PDCCH resource sent thereto by the network-side device, so that the terminal obtains the DCI of the preset type of service without performing the blind detection operation in any possible PDCCH transmission area, which reduces the complexity of obtaining the DCI of the preset type of service, and reduces the delay in obtaining the DCI of the preset type of service.

Figure 6:
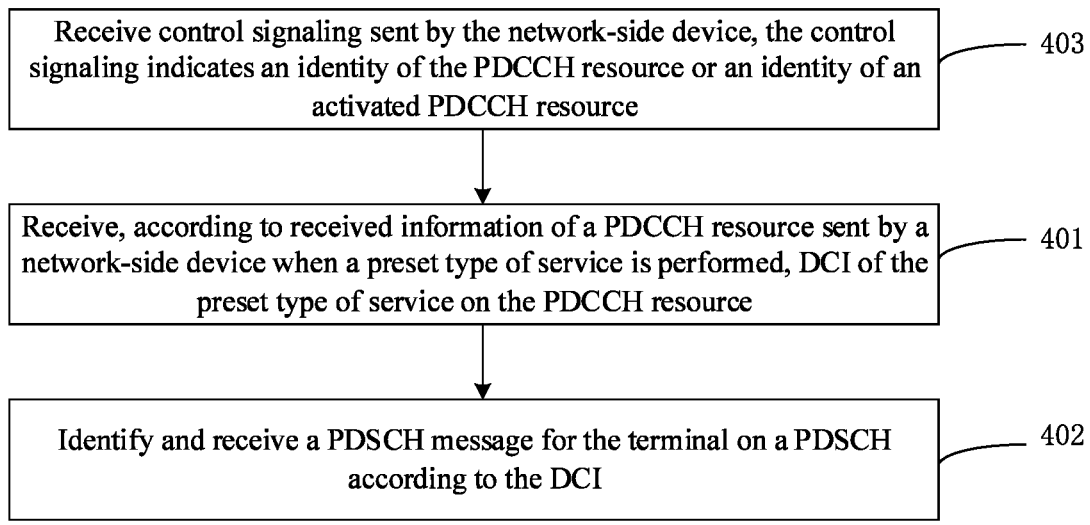
FIG. 6 is a flow chart showing a method for receiving downlink control information according to an exemplary embodiment.

FIG. 6 is a flow chart showing a method for receiving downlink control information according to an exemplary embodiment. As shown in FIG. 6, the method may further include receiving, in step 403, control signaling sent by the network-side device before the receiving of the DCI of the preset type of service on the PDCCH resource according to the received information of the PDCCH sent by the network-side device. The control signaling indicates an identity of the PDCCH resource, and after receiving the control signaling, the terminal can receive the DCI belonging thereto on the indicated PDCCH resource according to the identity of the indicated PDCCH resource. Alternatively, the control signaling indicates an identity of an activated PDCCH resource, the activated PDCCH resource includes the PDCCH resource pre-configured by the network-side device for the terminal, and after receiving the control signaling, the terminal can receive the DCI belonging thereto on the activated PDCCH resource according to the identity of the activated PDCCH resource. The control signaling may also indicate a service type identity of the preset type of service and a validity period of the PDCCH resource configured for the terminal. The control signaling may be, for example, RRC signaling or other high-level signaling.

In an implementation, the method for receiving downlink control information may further include receiving the PDCCH resource configured for the terminal by the network-side device with a REG or RB used as a minimum unit of the PDCCH resource before receiving the DCI of the preset type of service on the PDCCH resource according to the received information of the PDCCH resource sent by the network-side device. For example, the network-side device can configure for the terminal at least one REG or RB as the resource dedicated to the terminal to receive the DCI of the preset type of service. On this basis, the basic unit of the PDCCH resource mapping is no longer limited to the CCE, and can also be the REG or RB, which can improve the utilization of the REG or RB resources by the terminal.

In an implementation, the terminal uses the PDCCH resource according to the message of the PUCCH resource sent to the terminal by the network-side device, as the resource dedicated to receiving the DCI of the preset type of service, where the preset type of service can be communication services with high requirement on the reliability and latency, such as a URLLC service, or other communication services than the URLLC service.

In an implementation, the PDCCH resource configured by the network-side device for the terminal device can be configured in a semi-static configuration manner or a dynamic configuration manner.

In another implementation, the above-mentioned PDCCH resource may include at least one of a time domain resource, a frequency domain resource, and a code domain resource. For example, the terminal can use any PCCCH resource of the time domain resources, the frequency domain resource or the code domain resource to receive the DCI of the preset type of service according to the instructions of the network-side device, or the network-side device can also configure at least one of the time domain resource, the frequency domain resource, or the code domain resource for the terminal concurrently, and instruct the terminal to activate the corresponding frequency domain time domain resource, frequency domain resource or code domain resource when the terminal needs to receive the DCI of the preset type, and the terminal uses the activated time domain resource, frequency domain resource or code domain resource to receive the DCI of the present type of service sent by the network-side device.

The following describes the process of signaling interaction between the network-side device and the terminal in the DCI sending method and the DCI receiving method by way of example. In this example, the URLLC service is used as an example of the preset type of service. The terminal establishes an RRC connection with the network-side device. If the terminal currently uses the URLLC service, the network-side device allocates a dedicated physical bearer resource of the PDCCH to the terminal. For example, the network-side device allocates the dedicated physical bearer resource of the PDCCH to the terminal by sending control information to the terminal and indicating the PDCCH resource allocated to the terminal in the control signaling, and the dedicated physical bearer resource of the PDCCH can be used as the physical bearer resource dedicated to the terminal to receive the DCI of the URLLC service. The terminal does not obtain the DCI for the terminal by performing the blind detection on the message on the shared PDCCH, but receives the PDCCH message on the dedicated PDCCH resource allocated thereto by the network-side device, and receives the initial transmitted or retransmitted information of the PDSCH on the shared channel according to the content borne by the PDCCH, such as the DCI in the PDCCH. After the URLLC service of the terminal ends, the network-side device releases the PDCCH resources previously allocated to the terminal, and when other terminals use the URLLC service, the PDCCH resources can be allocated to the other terminals for use. If the network-side device does not receive a URLLC-based feedback message from the terminal or URLLC service data sent by the terminal within a period of time, the network-side device may consider that the terminal ends the URLLC service.

Regarding the device according to the above embodiments, the specific manner in which each of the modules performs operation has been described in detail in the embodiments of the relative methods, which will not be repeated here.

Figure 7:
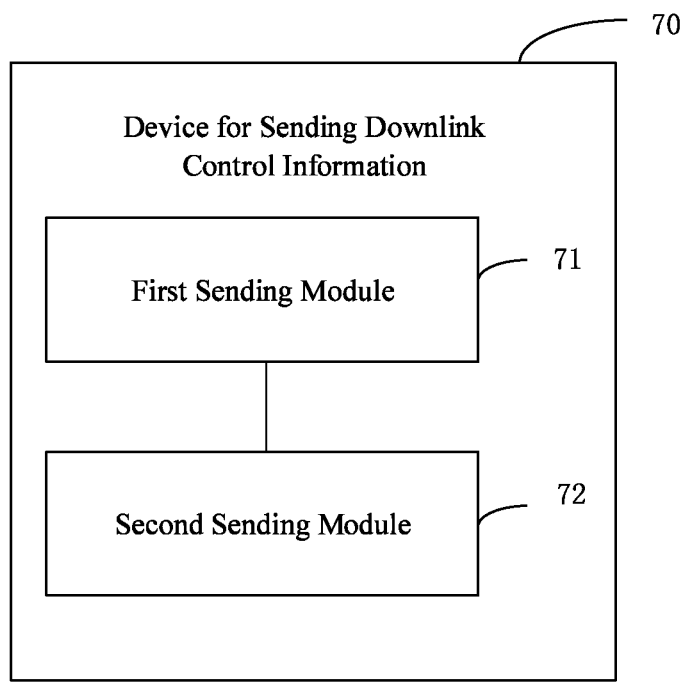
FIG. 7 is a block diagram showing a device for sending downlink control information according to an exemplary embodiment.

FIG. 7 is a block diagram showing a device for sending downlink control information according to an exemplary embodiment. The device is applied to a network-side device. As shown in FIG. 7, the device 70 can include a first sending module 71 that is configured to send information of a PDCCH resource to a terminal when it is determined that the terminal uses a preset type of service, to cause the terminal to receive DCI of the preset type of service on the PDCCH resource. The device can further include a second sending module 72 that is configured to send the DCI of the preset type of service to the terminal through the PDCCH resource.

In an implementation, the device 70 may further include a configuration module that is configured to configure the PDCCH resource for the terminal with a REG or RB used as a minimum unit of the PDCCH resource before the information of the physical downlink control channel (PDCCH) resource is sent to the terminal.

In an implementation, the configuration module can be configured to configure the PDCCH resource for the terminal in a semi-static configuration manner or a dynamic configuration manner.

In a further implementation, the first sending module can be configured to send control signaling to the terminal, where the control signaling indicates an identity of the PDCCH resource or an identity of an activated PDCCH resource, and the activated PDCCH resource includes the PDCCH resource pre-configured by the network-side device for the terminal. The PDCCH resource can include at least one of the following resources: a time domain resource, a frequency domain resource, and a code domain resource.

In an implementation, the preset type of service can include a URLLC service.

Figure 8:
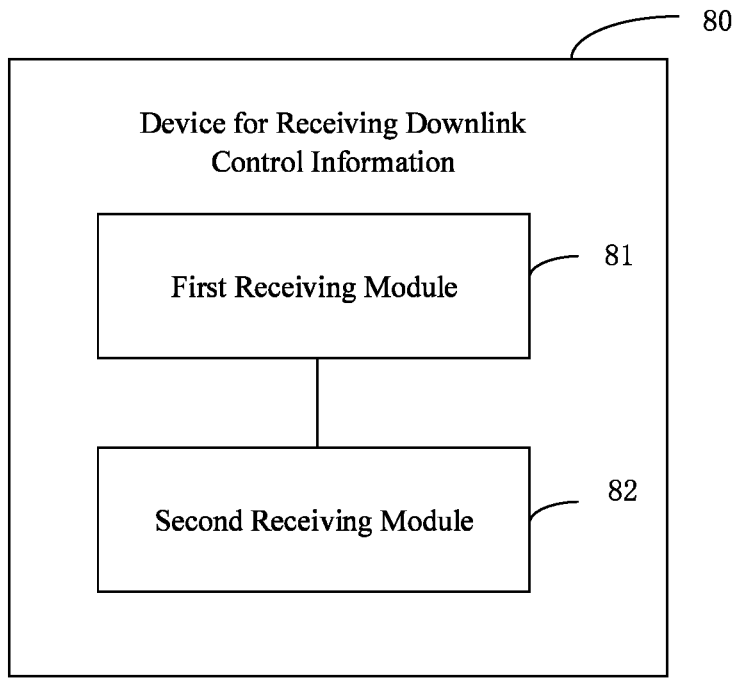
FIG. 8 is a block diagram showing a device for receiving downlink control information according to an exemplary embodiment.

FIG. 8 is a block diagram showing a device for receiving downlink control information according to an exemplary embodiment. The device is applied to a terminal. As shown in FIG. 8, the device 80 can include a first receiving module 81 that is configured to receive, according to received information of a Physical Downlink Control Channel (PDCCH) resource sent by a network-side device when a preset type of service is performed, Downlink Control Information (DCI) of the preset type of service on the PDCCH resource, and a second receiving module 82 that is configured to identify and receive a PDSCH message for the terminal on a PDSCH according to the DCI.

Figure 9:
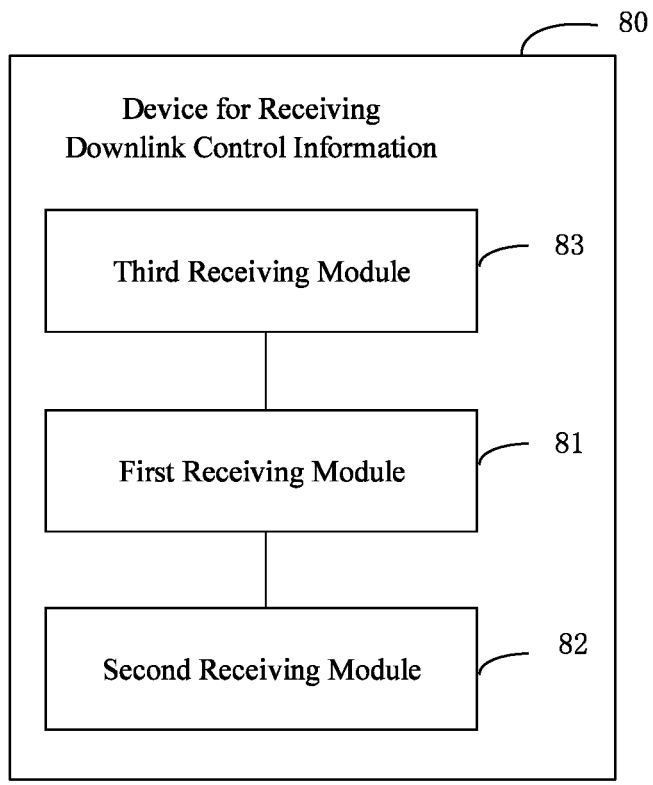
FIG. 9 is a block diagram showing a device for receiving downlink control information according to an exemplary embodiment.

FIG. 9 is a block diagram showing a device for receiving downlink control information according to an exemplary embodiment. As shown in FIG. 9, on the basis of the above-mentioned device 80, the device 90 may further include a third receiving module 83 configured to receive control signaling sent by the network-side device before the receiving of the DCI of the preset type of service on the PDCCH resource according to the received information of the PDCCH resource sent by the network-side device, where the control signaling indicates an identity of the PDCCH resource or an identity of an activated PDCCH resource, and the activated PDCCH resource includes the PDCCH resource pre-configured by the network-side device for the terminal.

In an implementation, the device 80 can further include a fourth receiving module that is configured to receive the PDCCH resource configured for the terminal by the network-side device with a Resource Element Group (REG) or Resource Block (RB) used as a minimum unit of PDCCH resource prior to the receiving of the DCI of the preset type of service on the PDCCH resource according to the received information of the PDCCH resource sent by the network-side device. The preset type of service can include a URLLC service.

In an implementation, the PDCCH resource configured by the network-side device for the terminal device can be configured in a semi-static configuration manner or a dynamic configuration manner.

Figure 10:
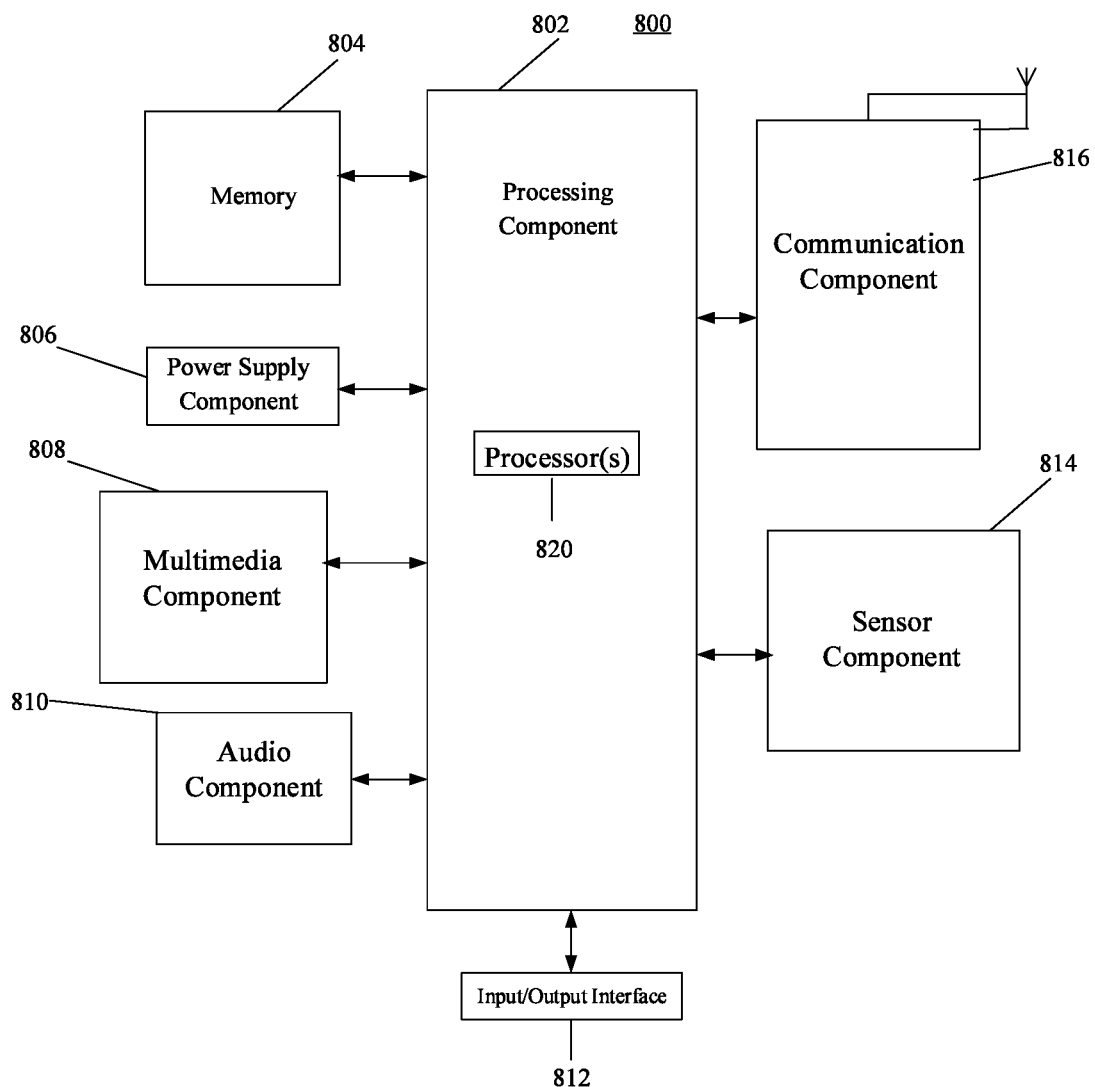
FIG. 10 is a block diagram showing a device for receiving downlink control information according to an exemplary embodiment.

FIG. 10 is a block diagram showing a device for receiving downlink control information according to an exemplary embodiment. For example, the device 800 may be a mobile phone, a computer, a digital broadcasting terminal, a messaging device, a game console, a tablet device, a medical device, a fitness device, a personal digital assistant, and the like.

Referring to FIG. 10, the device 800 may include one or more of the following components: a Processing Component 802, a memory 804, a power supply component 806, a multimedia component 808, an audio component 810, an input/output (I/O) interface 812, a sensor component 814, and a communication component 816.

The processing component 802 generally controls the overall operations of the device 800, such as operations associated with display, telephone calls, data communications, camera operations, and recording operations. The processing component 802 may include one or more processors 820 to execute instructions so as to implement all or part of the steps of the foregoing methods. In addition, the processing component 802 may include one or more modules to facilitate the interaction between the processing component 802 and other components. For example, the processing component 802 may include a multi-media module to facilitate the interaction between the multi-media component 808 and the processing component 802.

The memory 804 is configured to store various types of data to support operations on the device 800. Examples of the data include instructions for any application or method operating on the device 800, contact data, phone book data, messages, pictures, videos, etc. The memory 804 can be implemented in any type of volatile or non-volatile storage device, such as a static random access memory (SRAM), an electrically erasable programmable read-only memory (EEPROM), an erasable Programmable read-only memory (EPROM), a programmable read-only memory (PROM), a read-only memory (ROM), a magnetic memory, a flash memory, a magnetic disk or an optical disk.

The power supply component 806 provides power to various components of the device 800. The power supply component 806 may include a power management system, one or more power supplies, and other components associated with generating, managing, and distributing power for the device 800.

The multi-media component 808 includes a screen that provides an output interface between the device 800 and the user. In some embodiments, the screen may include a liquid crystal display (LCD) or a touch panel (TP). When the screen includes the touch panel, the screen can be implemented as a touch screen for receiving input signals from the user. The touch panel includes one or more touch sensors to sense gestures such as touching and sliding on the touch panel. The touch sensors can not only sense a boundary of the touching or sliding operation, but also detect a duration and pressure associated with the touching or sliding operation. In some embodiments, the multi-media component 808 includes a front camera and/or a rear camera. When the device 800 is in an operation mode, such as a shooting mode or a video mode, the front camera and/or the rear camera can receive external multi-media data. Each of the front camera and the rear camera can be a fixed optical lens system or have focusing and optical zooming capabilities.

The audio component 810 is configured to output and/or input audio signals. For example, the audio component 810 includes a microphone (MIC). When the device 800 is in an operation mode, such as a call mode, a recording mode or a voice recognition mode, the microphone is configured to receive external audio signals. The received audio signals may be further stored in the memory 804 or sent via the communication component 816. In some embodiments, the audio component 810 further includes a speaker for outputting the audio signals.

The I/O interface 812 provides an interface between the processing component 802 and a peripheral interface module. The peripheral interface module may be a keyboard, a click wheel, a button, or the like. The button may include but is not limited to a home button, a volume button, a start button, and a lock button.

The sensor component 814 includes one or more sensors for providing various state evaluations of the device 800. For example, the sensor component 814 can detect an on/off state of the device 800 and relative positioning of a component such as a display or a keypad of the device 800. The sensor component 814 can also detect a position change of the device 800 or a component of the device 800, presence or absence of contact with the device 800 by the user, orientation or acceleration/deceleration of the device 800, and temperature changes of the device 800. The sensor component 814 may include a proximity sensor configured to detect presence of a nearby object without any physical contact. The sensor component 814 may also include an optical sensor, such as a CMOS or CCD image sensor, for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other devices. The device 800 can access a wireless network based on any communication standard, such as a Wi-Fi, 2G, or 3G, or a combination thereof. In an exemplary embodiment, the communication component 816 receives a broadcast signal or broadcast related information from an external broadcast management system via a broadcast channel. In an exemplary embodiment, the communication component 816 further includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth (BT) technology or other technologies.

In an exemplary embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to perform the above methods.

In an exemplary embodiment, there is also provided a non-transitory computer-readable storage medium including instructions, such as the memory 804 including instructions. The instructions can be executed by the processor 820 of the device 800 to carry out the foregoing methods. For example, the non-transitory computer-readable storage medium may be a ROM, a random access memory (RAM), a CD-ROM, a magnetic tape, a floppy disk, an optical data storage device, and the like.

Figure 11:
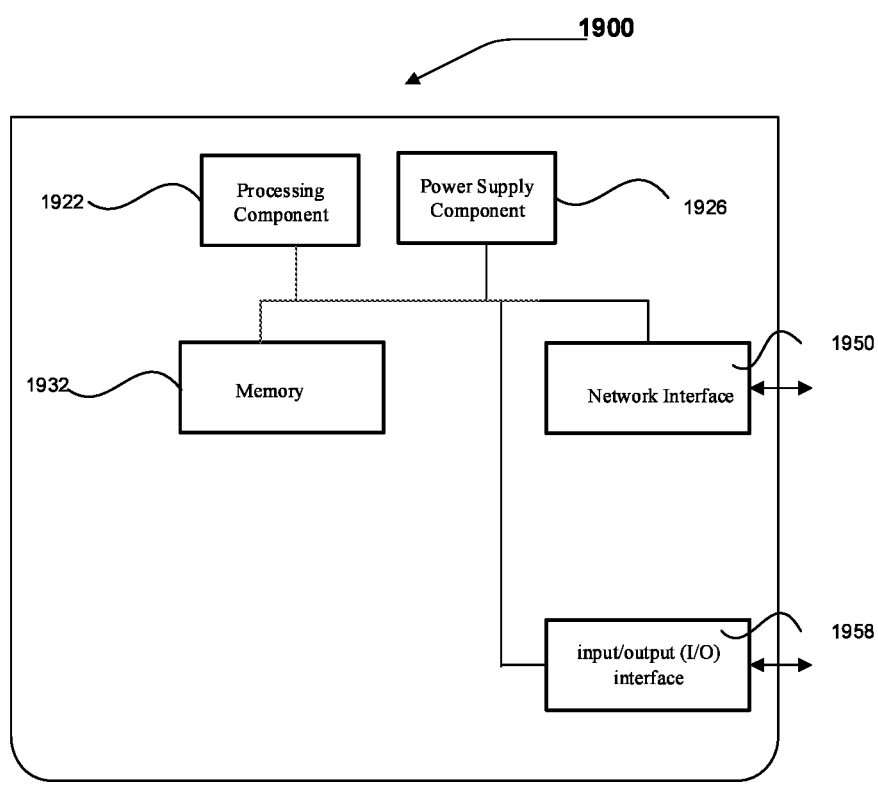
FIG. 11 is a block diagram showing a device for sending downlink control information according to an exemplary embodiment.

FIG. 11 is a block diagram showing a device for sending downlink control information according to an exemplary embodiment. For example, the device 1900 may be provided as a server. Referring to FIG. 11, the device 1900 includes a processing component 1922, which further includes one or more processors, and memory resources represented by the memory 1932 for storing instructions executable by the processing component 1922, such as application programs. The application program stored in the memory 1932 may include one or more modules each of which corresponds to a set of instructions. In addition, the processing component 1922 is configured to execute instructions to perform the aforementioned method for sending downlink control information.

The device 1900 may also include a power supply component 1926 configured to perform power management of the device 1900, a wired or wireless Network Interface 1950 configured to connect the device 1900 to a network, and an input/output (I/O) interface 1958. The device 1900 can operate based on an operating system stored in the memory 1932, such as Windows Server™, Mac OS X™, Unix™, Linux™, FreeBSD™ or the like.

In an exemplary embodiment, there is also provided a non-transitory computer-readable storage medium including instructions, such as the memory 1932 including instructions. The instructions can be executed by the processor 1922 of the device 1900 to carry out the foregoing methods. For example, the non-transitory computer-readable storage medium may be a ROM, a random access memory (RAM), a CD-ROM, a magnetic tape, a floppy disk, an optical data storage device, and the like.

After considering the description and practicing the disclosure disclosed herein, those skilled in the art will easily think of other embodiments of the disclosure. The disclosure is intended to cover any variations, uses, or adaptive changes of the disclosure that follow the general principles of the disclosure and include common general knowledge or common technical means in the technical field which are not disclosed in the disclosure. The description and embodiments shall be considered exemplary only, and the true scope and spirit of the disclosure are indicated by the claims.

It should be understood that the disclosure is not limited to the precise structures that have been described above and shown in the drawings, and various modifications and changes can be made without departing from the scope thereof. The scope of the disclosure is defined only by the appended claims.

What is claimed is:

1. A method for sending downlink control information that is applied to a network-side device, the method comprising:
receiving an access request sent by a terminal, wherein the access request comprises a service type of service requested by the terminal;
in response to determining, based on the service type comprised in the access request, that the terminal uses a preset type of service, sending information of a Physical Downlink Control Channel (PDCCH) resource to the terminal, to cause the terminal to receive Downlink Control Information (DCI) of the preset type of service on the PDCCH resource, wherein the information of the PDCCH resource comprises a dedicated physical bearer resource that is dedicated to receiving by the terminal the DCI of the preset type of service; and
sending the DCI of the preset type of service to the terminal through the PDCCH resource,
wherein sending the information of the PDCCH resource to the terminal further comprises:
sending control signaling to the terminal, wherein the control signaling indicates an identity of an activated PDCCH resource that includes the PDCCH resource pre-configured by the network-side device for the terminal.

2. The method according to claim 1, further comprising:
configuring the PDCCH resource for the terminal with a Resource Element Group (REG) or a Resource Block (RB) used as a minimum unit of the PDCCH resource prior to sending the information of the PDCCH resource to the terminal.

3. The method according to claim 2, wherein the configuring the PDCCH resource for the terminal further comprises:
configuring the PDCCH resource for the terminal in a semi-static configuration manner or a dynamic configuration manner.

4. The method according to claim 1, wherein the preset type of service further comprises:
an Ultra Reliable and Low Latency Communication (URLLC) service.

5. The method according to claim 1, wherein the PDCCH resource further comprises at least one of a time domain resource, a frequency domain resource, and a code domain resource.

6. A method for receiving downlink control information that is applied to a terminal, the method comprising:
sending an access request to a network-side device, wherein the access request comprises a service type of service requested by the terminal, and the service type comprised in the access request is used for the network-side device to determine whether the terminal uses a preset type of service;
receiving information of a Physical Downlink Control Channel (PDCCH) resource sent by the network-side device;
receiving, according to the information of the PDCCH resource, Downlink Control Information (DCI) of the preset type of service on the PDCCH resource, wherein the information of the PDCCH resource comprises a dedicated physical bearer resource that is dedicated to receiving by the terminal the DCI of the preset type of service; and identifying and receiving a Physical Downlink Shared Channel (PDSCH) message for the terminal on a PDSCH according to the DCI, wherein receiving the information of the PDCCH resource sent by the network-side device further comprises:

receiving control signaling sent by the network-side device, wherein the control signaling indicates an identity of an activated PDCCH resource that includes the PDCCH resource pre-configured by the network-side device for the terminal.

7. The method according to claim 6, further comprising:
receiving the PDCCH resource configured for the terminal by the network-side device with a Resource Element Group (REG) or Resource Block (RB) used as a minimum unit of PDCCH resource prior to the receiving, according to the received information of the PDCCH resource sent by the network-side device, the DCI of the preset type of service on the PDCCH resource.

8. The method according to claim 6, wherein the PDCCH resource configured by the network-side device for the terminal device is configured in a semi-static configuration manner or a dynamic configuration manner.

9. The method according to claim 6, wherein the preset type of service further comprises:
an Ultra Reliable and Low Latency Communication (URLLC) service.

10. The method according to claim 6, wherein the PDCCH resource further comprises at least one of a time domain resource, a frequency domain resource, and a code domain resource.

11. A device for sending downlink control information that is applied to a network-side device, the device comprising:
a processor; and
a memory for storing instructions executable by the processor,
wherein the processor is configured to:
receiving an access request sent by a terminal, wherein the access request comprises a service type of service requested by the terminal,
in response to determining, based on the service type comprised in the access request, that the terminal uses a preset type of service, send information of a Physical Downlink Control Channel (PDCCH) resource to the terminal, to cause the terminal to receive Downlink Control Information (DCI) of the preset type of service on the PDCCH resource, wherein the information of the PDCCH resource comprises a dedicated physical bearer resource that is dedicated to receiving by the terminal the DCI of the preset type of service; and
send the DCI of the preset type of service to the terminal through the PDCCH resource,
wherein sending the information of the PDCCH resource to the terminal further comprises:
sending control signaling to the terminal, wherein the control signaling indicates an identity of an activated PDCCH resource that includes the PDCCH resource pre-configured by the network-side device for the terminal.

12. The device according to claim 11, wherein the processor is further configured to:
configure the PDCCH resource for the terminal with a Resource Element Group (REG) or a Resource Block (RB) used as a minimum unit of the PDCCH resource prior to sending the information of the PDCCH resource to the terminal.

13. The device according to claim 12, wherein the configuring the PDCCH resource for the terminal further comprises:
configuring the PDCCH resource for the terminal in a semi-static configuration manner or a dynamic configuration manner.

14. The device according to claim 11, wherein the preset type of service further comprises:
an Ultra Reliable and Low Latency Communication (URLLC) service.

15. The device according to claim 11, wherein the PDCCH resource further comprises at least one of a time domain resource, a frequency domain resource, and a code domain resource.

16. A device for receiving downlink control information that is applied to a terminal, the device comprising:
a processor; and
a memory for storing instructions executable by the processor,
wherein the processor is configured to perform the method according to claim 6.

* * * * *